United States Patent [19]

Moser

[11] Patent Number: 4,889,200

[45] Date of Patent: Dec. 26, 1989

[54] ROCK DRILL

[75] Inventor: Bernhard Moser, Altshausen, Fed. Rep. of Germany

[73] Assignee: HAWERA Probst GmbH+Co., Ravensburg, Fed. Rep. of Germany

[21] Appl. No.: 165,092

[22] Filed: Mar. 7, 1988

[30] Foreign Application Priority Data

Nov. 3, 1987 [DE] Fed. Rep. of Germany ....... 3707798

[51] Int. Cl.⁴ .................. E21B 10/44; E21B 10/58
[52] U.S. Cl. .................................. 175/394; 175/410
[58] Field of Search ............... 175/323, 327, 394, 410, 175/412, 415, 430, 421

[56] References Cited

U.S. PATENT DOCUMENTS

| | | |
|---|---|---|
| 1,106,966 | 8/1914 | Pauli . |
| 1,324,631 | 12/1916 | Usrey . |
| 2,051,525 | 8/1936 | Howard . |
| 2,522,045 | 9/1950 | Knowles ............................. 175/410 |
| 2,890,021 | 6/1959 | Sanvig ............................. 175/410 X |
| 2,969,846 | 1/1961 | Sanvig ............................. 175/410 X |
| 3,198,270 | 8/1965 | Horvath ............................. 175/410 |
| 4,314,616 | 2/1982 | Rauckhorst et al. ................ 175/394 |
| 4,765,419 | 8/1988 | Scholz et al. ........................ 175/415 |

FOREIGN PATENT DOCUMENTS

| | | |
|---|---|---|
| 0187971 | 7/1986 | European Pat. Off. . |
| 199063 | 6/1908 | Fed. Rep. of Germany . |
| 924014 | 7/1949 | Fed. Rep. of Germany . |
| 2528003 | 1/1977 | Fed. Rep. of Germany . |
| 1193899 | 12/1981 | Fed. Rep. of Germany . |
| 8234241 | 9/1983 | Fed. Rep. of Germany . |
| 151171 | 5/1984 | Fed. Rep. of Germany . |
| 783708 | 7/1935 | France . |
| 2075409 | 11/1981 | United Kingdom ................ 175/327 |

Primary Examiner—Jerome W. Massie
Assistant Examiner—David J. Bagnell
Attorney, Agent, or Firm—Spencer & Frank

[57] ABSTRACT

A rock drill is provided in which an optimum support of the carbide cutting tip or of a cross cutting edge is achieved by the drill head being made square or rectangular in cross-section. This results in an optimum strengthening of the cross-section against fracture in the slot root for the cutting tips. Moreover, catching of the drill in fissured rock and under extreme loads such as in reinforcement drill holes is avoided.

6 Claims, 1 Drawing Sheet

ROCK DRILL

BACKGROUND OF THE INVENTION

Field of the Invention

The invention relates to a rock drill having a single or double spiral shank and at least one carbide cutting plate extending over the entire diameter of the drill head.

DISCUSSION OF THE PRIOR ART

Rock drills with carbide cutting tips are used for drilling holes in concrete, masonry, rock or other similar materials. To produce drilling tools of this type, the starting point is generally a material having a round cross-section, since the rotary use of the tool generally requires a circular cross-section. In known tools, therefore, both the drill head and the spiral thread have a circular cross-section to penetrate into the drill hole. Another reason for this is that the cylindrical outer contour of drill head and spiral thread are simple to produce. Depending on the type of construction of the rock drill, the head is ground before and/or after the insertion and brazing-in of the carbide cutting tip and the cross cutting edge in order to create a geometry adapted to the cutting tip, the cross cutting edge and the drilling-dust grooves in the area of the drill head. Here, however, the basically cylindrically shaped construction of the drill head is retained, even though the drill head does not function as a cutting element in rock drills rather as a supporting element for the cutting tips. In this connection, the drill head has the important task of creating an optimum support for the carbide cutting tip or the cross cutting edge. However, making the drilling dust grooves in the drill head often results in a considerable reduction in the drill head cross-section, which leads to chipping of the carbide cutting tips when the drilling tool is heavily stressed. This results in a drilling tool which can no longer be used.

In known drilling tools, the cutting tips of rock drills are supported by reducing the cross-section of the drill head as little as possible in the area of the recessed groove for the cutting element. This is accomplished, for example, by not removing much material when grinding the drill head. The cutting elements are thereby well supported at the back. But this has the disadvantage that, as a result of the circular cross-section of the drill head, little or no chip space is available for the drilling dust to be removed. As a result additional drilling-dust grooves have to be made in the drill head. However, these drilling-dust grooves weaken the drill head in its entire cross-section so that there is an increased risk of fracture. In addition, grinding the drill head in the area of the cutting elements produces a drill head geometry which can lead to catching of the drill head in holes which are difficult to drill such as, e.g. drilling in fissured rock and reinforcement drill holes.

SUMMARY OF THE INVENTION

The object of the present invention is to provide a rock drill which does not have the abovementioned disadvantages and in particular ensures optimum strength of the drill head and greatest possible support of the carbide cutting tip tips without the drill cross-section in the area of the drill head being reduced by incorporating additional drilling-dust grooves. It is a further object of the present invention to provide a rock drill where catching of the drill head in difficult drilling situations can be avoided.

The invention is based on the knowledge that the circular cross-section of the drill head normally used is not necessary for supporting the cutting tip, since the circular shape only produces a negligibly higher supporting force for the cutting elements in the area of the grooves compared to this area having flat surfaces. According to the present invention, therefore, the cross-section of the drill head is not circular but rather is square, i.e. four circular segments are removed from the circular cross-section, and thus this forms the drilling-dust grooves. The carbide cutting tip or the cross cutting edges are then inserted in the square cross-section of the drill head in such a way that they are aligned either diagonally to the corner areas of the square or at right angles to the side faces. A cross-section optimally strengthened against fracture in the slot root is thereby obtained, and drilling-dust grooves result from the flattened sections of the square-shaped cross-section. No additional recesses are therefore necessary for forming a drilling-dust groove in the drill head, and so there is no reduction in the cross-section of the drill head as a result of drilling-dust grooves.

As tests have shown, catching of the drill head when drilling in difficult materials, such as fissured rock and reinforcement drill holes, is also avoided or improved with the drilling tool according to the invention when compared with conventional drills.

In a further feature of the invention, the side faces of the drill head are aligned so that they are parallel with the drill longitudinal axis. This feature is desirable since it is particularly simple to bring about.

In a further feature of the invention, the side faces of the drill head are ground in to different depths so that the primary cutting edge is supported by means of two opposite faces which are disposed further out radially than the two other opposite side faces. This slightly rectangular cross-section of the drill head results in drilling-dust grooves which are enlarged in front of the primary cutting edges. Since the secondary cutting edges of a cross cutting edge are subjected to less stress, the support by the drill head is adequate for these axially set-back cutting edges.

In another feature of the invention, the cutting tip or the cross cutting edge can also be aligned at right angles to the flat side faces of the drill head. In this case, however, the outer diameter of the carbide cutting elements must be larger than the outer diameter of the square cross-section of the drill head through the corner points. In this type of construction, therefore, the cutting elements protrude beyond the side faces of the drill head, so that an enlarged chip space or an enlarged drilling-dust groove is obtained directly in front of the cutting elements. However, the supporting effect of the cutting elements in the outer end area is not as great as when these cutting elements are arranged diagonally to the corner areas of the square cross-section of the drill head.

In the drilling tool according to the invention with a square or almost square cross-section of the drill head, it has proved to be advantageous when the axially set-back cutting element of a cross cutting edge is made flat in its upper area. The bearing surface of the cross cutting edge is thereby reduced, in particular during impact loading, so that the impact pressure on the axially projecting primary cutting edge of the cross cutting element is substantially increased. Thus the advantage of the single-point tool with high contact pressure is advantageously combined with the uniform concentric running of a cross cutting edge.

In a further development of the invention, cutting pins can be inserted instead of the axially set-back secondary cutting tip of a cross cutting element. Cutting pins of this type have been disclosed, for example, by DE-A1-2,528,003. In this embodiment of the invention, the square cross-section of the drill head is basically retained so that the advantage described above appear here too.

BRIEF DESCRIPTION OF THE DRAWINGS

Further features of the invention are described in the following advantageous and expedient exemplary embodiments of the invention and are shown in the drawing, in which.

DESCRIPTION OF THE PREFERRED EMBODIMENTS

Figure 1:
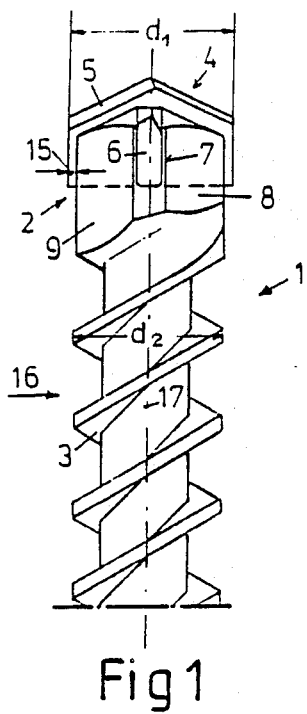
FIG. 1 shows a side elevational view of the drilling tool according to the invention.

The rock drill (1) shown in FIG. 1 consists of a drill head (2) and a single-start or double-start spiral shank (3). The drill head (2) is provided with a cross-cutting plate (4), consisting of the primary cutting tip or (5) displaced axially in the drilling direction of the secondary cutting tip or edge (6) set back axially in the drilling direction from the primary cutting edge (5). The cross cutting plate (4) is brazed into grooves (7) of the drill head in a manner which is known per se. The V-shaped or roof-shaped configuration of the primary cutting edge forms an obtuse angle at its tip.

Figure 2:
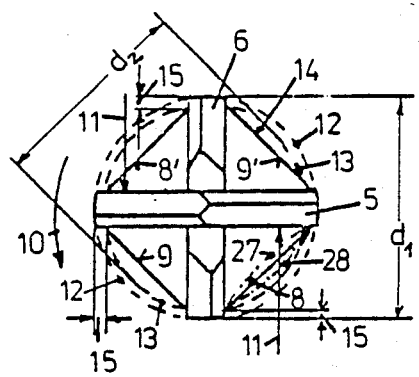
FIG. 2 shows an enlarged top plan view or end view of the representation according to FIG. 1.

As shown in FIGS. 1 and 2, the drill head (2) has a square cross section with four flat side faces, (8, 8', 9, 9') respectively. These are aligned in parallel with the longitudinal axis (17) of the drill and support the primary cutting edge (5) and the second cutting edge (6). The direction of rotation of the drilling tool is identified by arrow (10). The arrows (11) symbolically represent the supporting force with which the drill head has to support the primary cutting edge (5).

The outer circle diameter $d_1$ of the cross cutting edge (4) is shown in FIGS. 1 and 2 and this diameter forms the circumcircle (12) shown in FIG. (2). The spiral shank diameter $d_2$ shown in FIGS. 1 and 2 is forms the circumcircle (13) shown in FIG. 2. Of course, the outer diameter $d_1$ of the cross cutting edge (4) has to be larger when compared with the diameter $d_2$ of the spiral groove.

As a result of the square cross-section of the drill head with the flat side faces (8, 8', 9, 9') respectively, there arises between these surfaces and the circumcircle (12), a chip space drilling-dust groove (14) which serves to remove the drilling dust. If the drill head were of a cylindrical configuration, it would assume an outer contour corresponding to the circumcircle (13), which in turn corresponds to the spiral shank diameter $d_2$. The flattened section of the side faces (8) and (9) respectively therefore results in an additional chip space, as a result of which it is not necessary to cut or grind in a separate drilling-dust groove.

As is apparent from FIG. 2, the side faces (8, 8', 9, 9') respectively are arranged in such a way that they are almost flush with the outer corner areas of the primary cutting edge (5) or secondary cutting edge (6) respectively so that only a small projecting area (15) results in an effective cutting edge.

Figure 3:
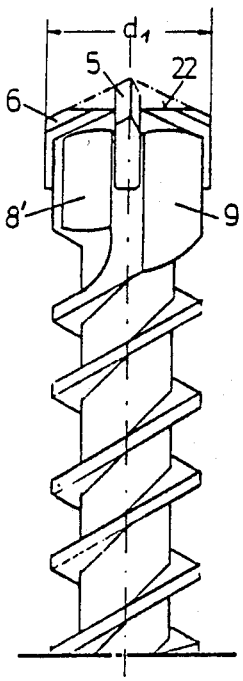
FIG. 3 shows a side elevational view of the representation according to FIG. 1 (rotated 90°)

The representation according to FIG. 3 is a side view that is taken along the arrow (16) in FIG. 1. The same parts are identified by the same reference numerals. The side faces (8' and 9) appear in this view of the rock drill. The side faces (8, 8', 9, 9') respectively are always aligned in parallel with the longitudinal axis (17) of the drill.

Figure 4:
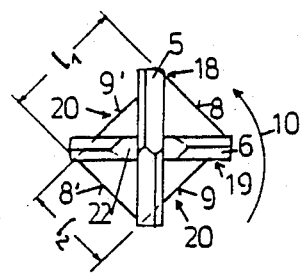
FIG. 4 shows a top plan view of the representation according to FIG. 3, but with a variation in the side faces.

According to the representation of the invention in FIG. 4, the length of the side faces (8) are (8') respectively differs from the length of the side faces (9) and (9') respectively. Here, the side faces (8) and (8') respectively are arranged so that they are located as far as possible toward the ends of the cutting edges in accordance with the representation in FIG. 2. They are located so that they are as flush as possible with the corner areas (18) of the primary cutting edge (5). The distance between the side faces (8) and (8') respectively is designated by $L_1$. In contrast, the two side faces (9) and (9') respectively are inwardly displaced from the ends of the cutting edges so that the support behind the secondary cutting edge (6) is not as great in the corner areas (19) as at the primary cutting edge (5). The distance between the side faces (9, 9') is identified by $L_2$. The distance $L_1$ is accordingly greater than the distance $L_2$. A larger chip space (20) is thereby obtained in front of the primary cutting edges (5), which leads to an improvement in the removal of the drilling dust. In this case, therefore, the square cross-section of the drill head has been slightly modified and is rectangular in configuration.

Figure 5:
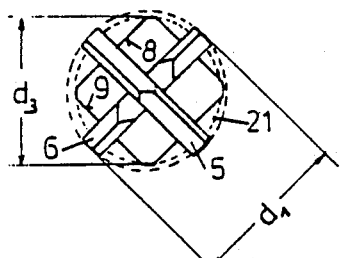
FIG. 5 shows a top plan view of a variant of the cutting element arrangement where the cutting elements are disposed at right angles to the side faces.

In the embodiment of the invention according to FIG. 5, the primary cutting edge (5) and the secondary cutting edge (6) are not aligned in the direction of the corner areas of the square cross-section but at right angles to the side faces. Here, the outer diameter $d_1$ of the cross cutting edge must be larger than the circumcircle (21) formed by the diameter $d_3$ which is through the corners of the square cross-section. The diameter $d_3$ of this circumcircle (21) through the corner areas of the square cross-section generally corresponds to the diameter $d_2$ of the spiral shank.

Owing to the right-angled arrangement of the cross cutting edge relative to the side faces (8) and (9) respectively, the end areas of the primary cutting edge (5) and the secondary cutting edge (6) respectively protrude far beyond the key face. A large chip space is thereby obtained directly in front of the cutting elements (5, 6) of the cross cutting edge (4).

Moreover, the flattened section (22) of the secondary cutting edge (6) is shown in FIGS. 3 and 4. The primary cutting edge (5) thereby protrudes axially relative to the secondary cutting edge (6), which leads to an increase in the working pressure.

Figure 6:
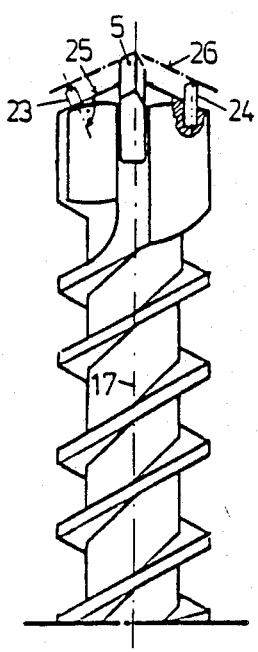
FIG. 6 shows a side elevational view of a further embodiment of the rock drill wherein cutting pins are provided.
Figure 7:
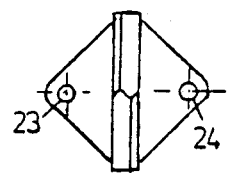
FIG. 7 shows a top plan view of the drilling tool according to FIG. 6.

In the alternative embodiment of the invention according to FIGS. 6 and 7, cutting pins (23, 24) are inserted instead of the secondary cutting edge (6) of a cross cutting element (4). In this embodiment, a cutting pin (23), shown on the left-hand side in FIG. 6, is inserted with its longitudinal axis at an angle to the longitudinal axis (17) and this cutting pin is at right angles to the grinding plane (25) of the upper part of the drill head. On the right-hand side of FIG. 6, the cutting pin (24) is inserted parallel to the longitudinal axis (17). The cutting pins (23, 24) protrude axially into the cutting plane (26) of the primary cutting element (5).

As indicated in FIG. 2 at the side face (8), this side face can either be made flat or, in special cases, even arched. Thus reference numeral (27) indicates a slightly concavely arched side face, and reference numeral (28) indicates a slightly convexly arched side face. The concave configuration increases the chip space area, and the convex configuration increases the strength. Here, the convex configuration of the side face is made smaller in its circumcircle than the circumcircle (13) which corresponds to the diameter $d_2$ of the spiral shank.

The invention is not restricted to the exemplary embodiment shown and described. On the contrary, it also comprises all modifications and further developments made by a person skilled in the art without inventive content of its own. Thus a simple cutting element, represented by the primary cutting edge (5), can also be used instead of the cross cutting edge (4).

I claim:

1. A rock drill having a longitudinal axis comprising:
   a spiral shank; and
   a drill head disposed at one end of said spiral shank, said drill head having cross cutting plates extending across said drill head and projecting beyond the peripheral contour of said drill head, said cross cutting plates including primary and secondary cutting tips, said primary cutting tip having a roof shape such that the area of said primary cutting tip intersecting the longitudinal axis of said drill is disposed furthest from said drill head, said drill head further having a substantially square cross section with corners, side faces which are parallel to the longitudinal axis and each of said cutting tips extends between opposite corners of said drill head.

2. A rock drill as defined in claim 1, wherein said primary cutting tip includes radially outwardly disposed end areas and two of said side faces of said drill head which are oppositely disposed abut said primary cutting tip so that each said opposite side face is substantially flush with one of the end areas of said primary cutting tip, and wherein the other oppositely disposed side faces abut said primary cutting tip at a location which is disposed radially inward of said end areas.

3. A rock drill as defined in claim 1, wherein said primary and secondary cutting tips are provided with interlocking grooves and said primary and secondary cutting tips are disposed in and brazed to a cross shaped groove provided in said drill head, and wherein said secondary cutting tip includes an upper surface having a portion thereof which is flat.

4. A rock drill as described in claim 1, wherein said cutting plate is composed of carbide.

5. A rock drill having a longitudinal axis comprising:
   a spiral shank; and
   a drill head disposed at one end of said spiral shank, said drill head having cross cutting plates extending across said drill head and projecting beyond the peripheral contour of said drill head, said cross cutting plates including primary and secondary cutting tips, said primary cutting tip having a roof shape such that the area of said primary cutting tip intersecting the longitudinal axis of said drill is disposed furthest from said drill head, said drill head further having a substantially square cross section with corners, side faces which are parallel to the longitudinal axis and each of said cutting tips is disposed at right angles to said side faces of said drill head.

6. A rock drill having a longitudinal axis comprising:
   a spiral shank; and
   a drill head disposed at one end of said spiral shank, said drill head having a cutting plate extending across said drill head and projecting beyond the peripheral contour of said drill head, said cutting plate having a roof shape such that the area of said cutting plate intersecting the longitudinal axis of said drill is disposed furthest from said drill head, said drill head further having a substantially square cross section with corners, side faces disposed parallel to the longitudinal axis of said drill and cutting pins disposed in said drill head, and wherein at least one of said cutting pins being disposed parallel with the longitudinal axis of said drill and at least one other of said cutting pins being disposed at right angles to a grinding plane of said drill head.

* * * * *